UNITED STATES PATENT OFFICE.

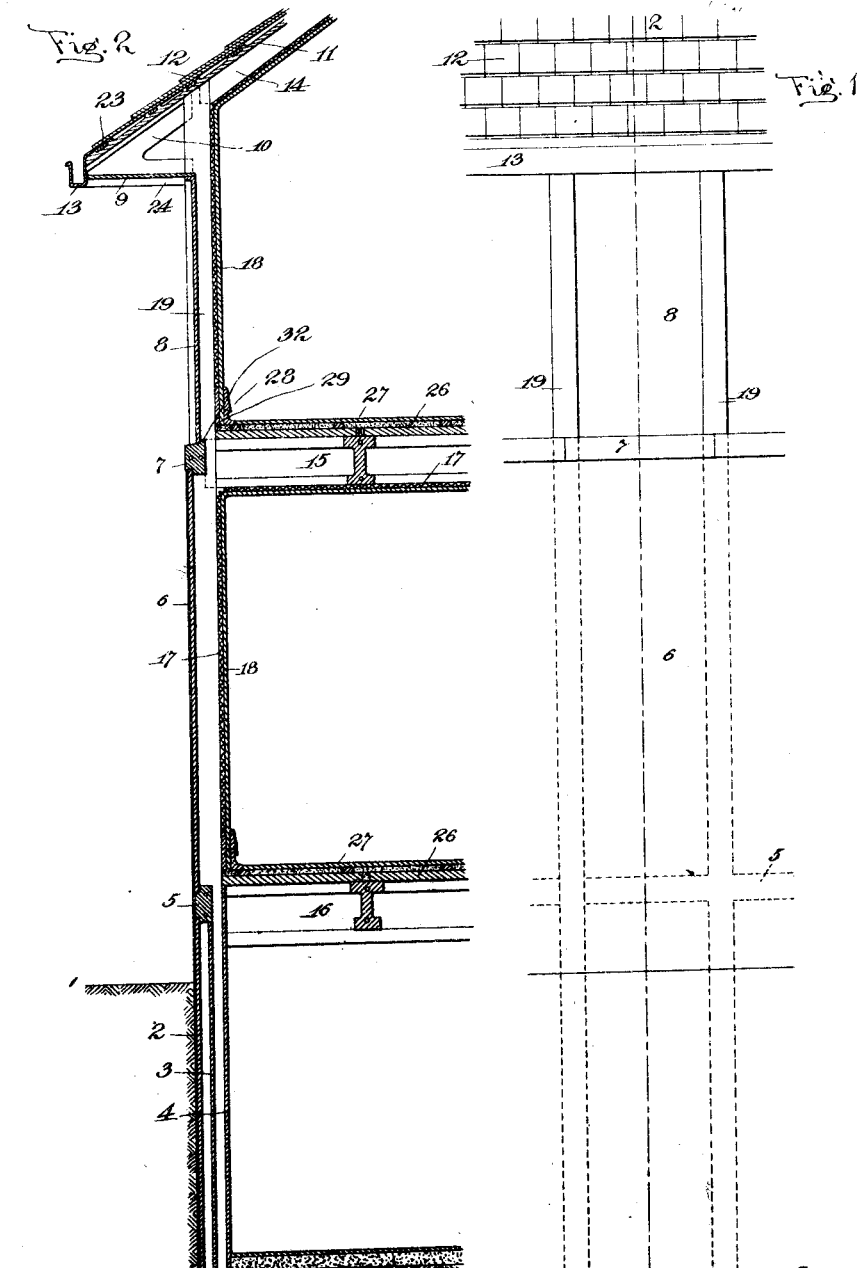

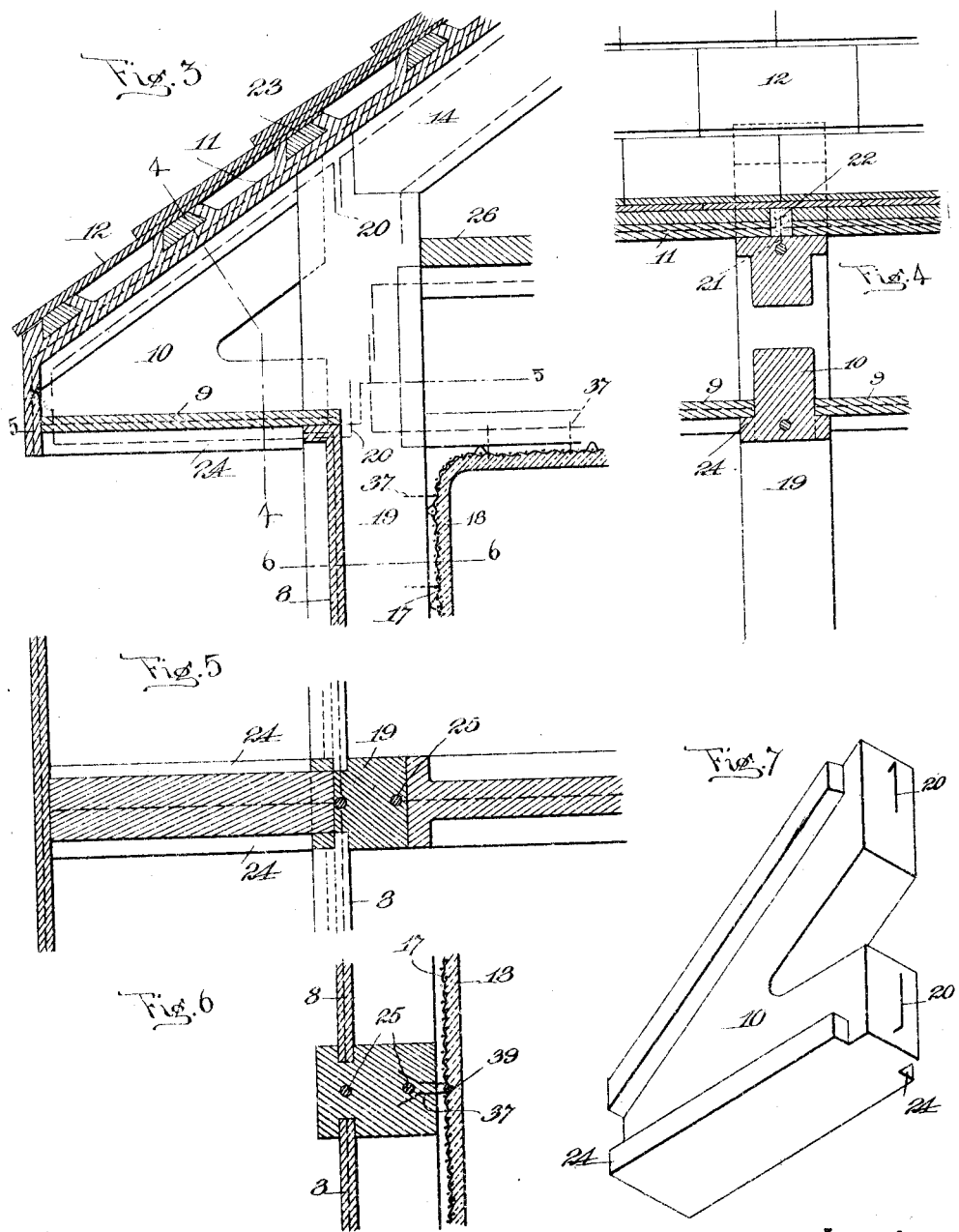

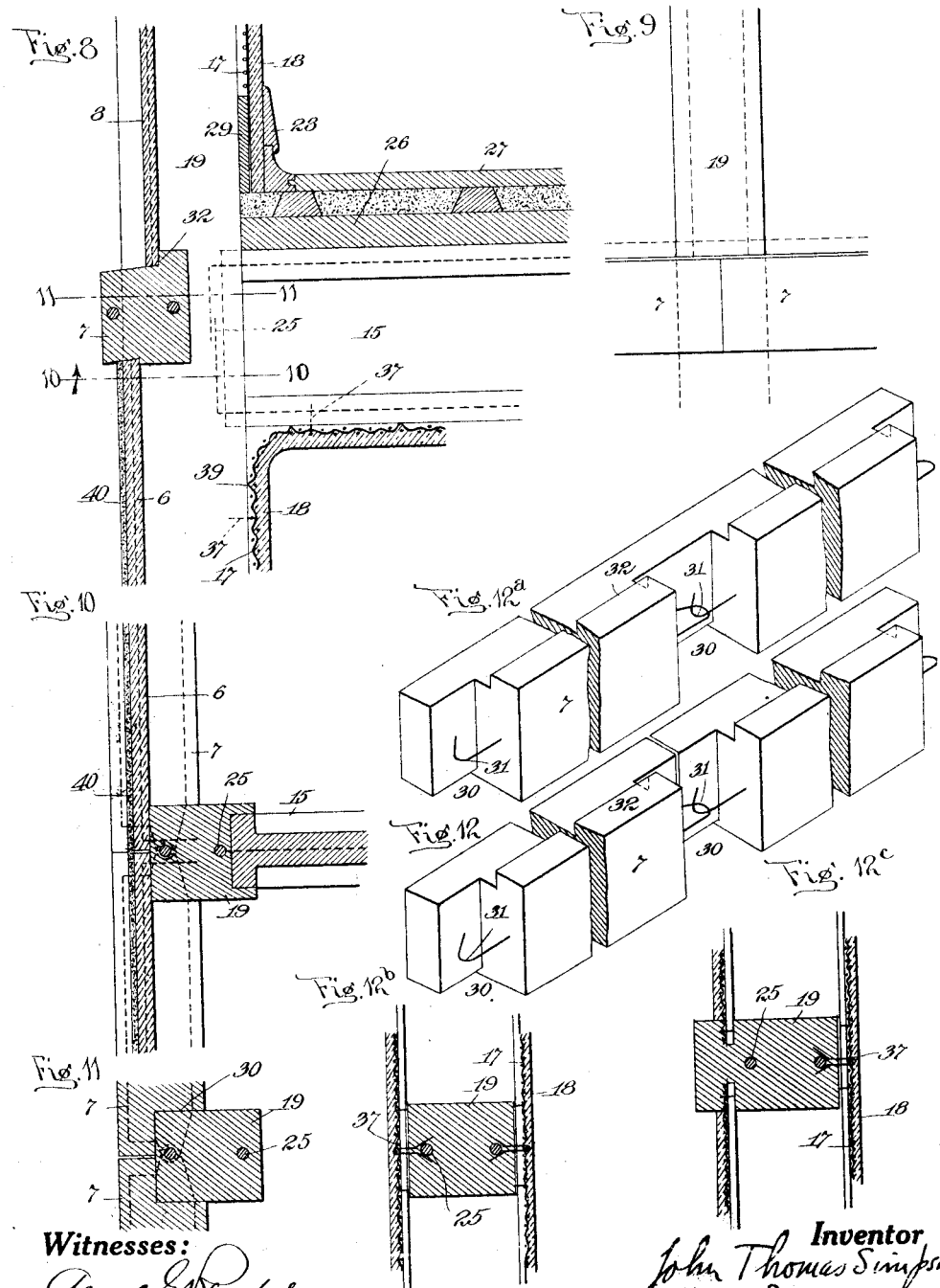

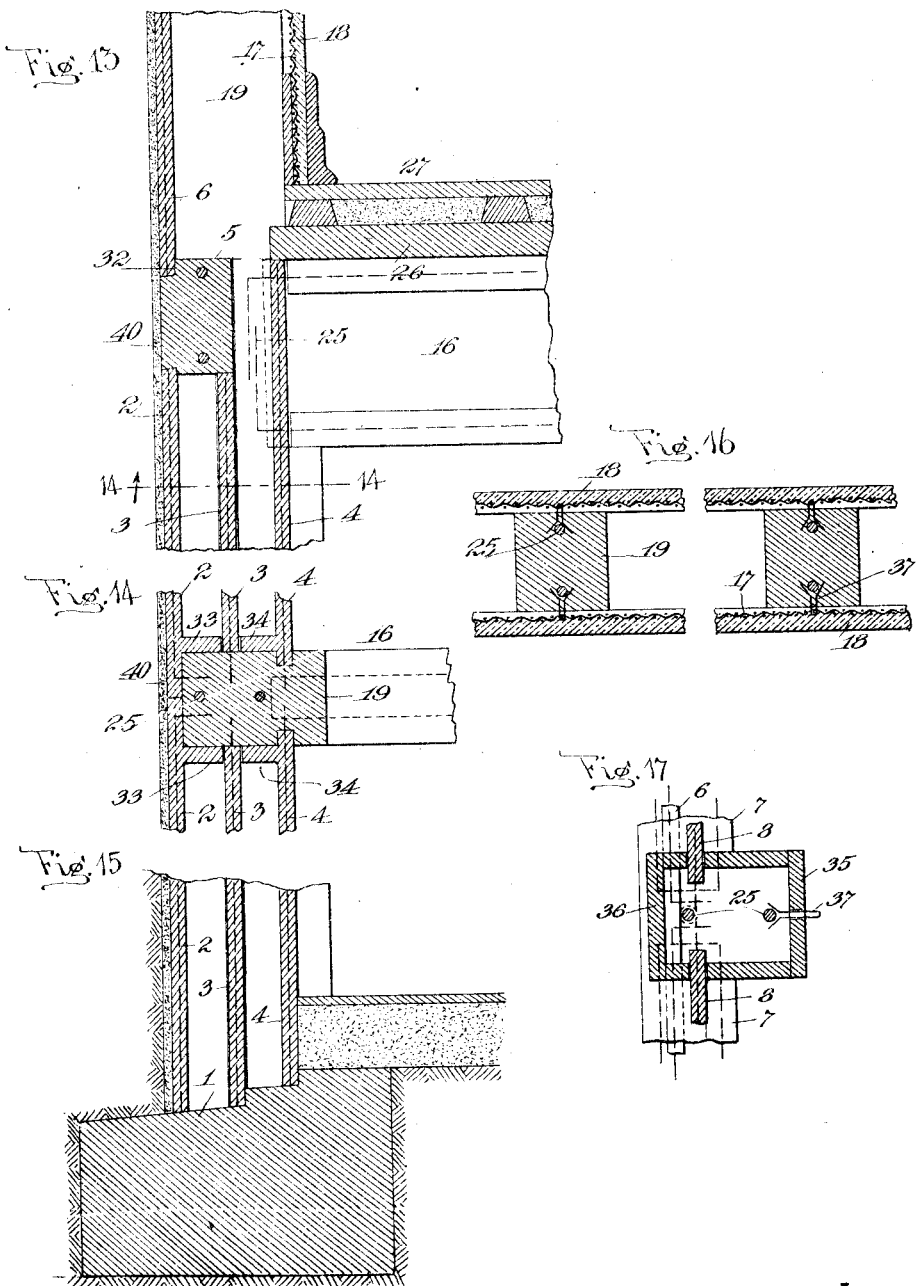

JOHN THOMAS SIMPSON, OF NEWARK, NEW JERSEY.

CONCRETE BUILDING.

1,198,785.   Specification of Letters Patent.   Patented Sept. 19, 1916.

Original application filed March 25, 1914, Serial No. 827,080. Divided and this application filed May 19, 1915. Serial No. 29,030.

*To all whom it may concern:*

Be it known that I, JOHN THOMAS SIMPSON, a citizen of the United States, and resident of Newark, county of Essex, State of New Jersey, have invented a certain new and useful Concrete Building, of which the following is a specification.

This invention relates to improvements in concrete buildings and is particularly designed as an improvement upon the invention disclosed in my application for patent filed November 7, 1912, Serial No. 729,923, and is a division of my application for patent filed March 25, 1914, Serial No. 827,080.

The particular objects of the invention are: First: to make the invention applicable to the construction of buildings of greater variety and to provide for increasing or reducing the size of a building without rearranging the field molded elements, for the reason that the building may have an inside and an outside with a flat surface instead of the timbered effect necessary to the building made according to my invention in my application Serial No. 729,923. Second: to arrange for the securing of a timbered effect, if such be desired, in one or more stories. Third: to provide for an air space entirely around the building and inside of the studs. These and further objects will more fully appear from the following specification and accompanying drawings, considered together or separately.

In the drawings, Figure 1 is an elevation of part of a building embodying my invention; Fig. 2 is a section on the line 2, 2 of Fig. 1; Fig. 3 is a view, in section, on a larger scale showing the details of construction of the roof and cornice; Fig. 4 is a section on the line 4, 4 of Fig. 3; Fig. 5 is a section on the line 5, 5 of Fig. 3; Fig. 6 is a section on the line 6, 6 of Fig. 3; Fig. 7 is a perspective view of a corbel or cornice bracket; Fig. 8 is a sectional view of the wall and floor of the second story shown in Figs. 1 and 2; Fig. 9 is an elevation of the outside of the structure illustrated in Fig. 8; Fig. 10 is a sectional view on the line 10, 10 of Fig. 8 looking upward; Fig. 11 is a sectional view on the line 11, 11 of Fig. 8; Fig. 12 is a perspective view of two alined spandrel beams constituting a band course; Fig. 12$^a$ is a similar view of a modified form of a spandrel beam; Fig. 12$^b$ is a section through a stud showing an outer wall formed of lath and plaster; Fig. 12$^c$ is a similar view, but with a projecting face of the stud showing on the outside, producing a half-timbered effect; Fig. 13 is a view similar to Fig. 8 of the first floor of the building shown in Figs. 1 and 2; Fig. 14 is a sectional view on the line 14, 14 of Fig. 13 looking in the direction of the arrow; Fig. 15 is a sectional view of the footing, or foundation, and cellar floor of the building; Fig. 16 is a horizontal sectional view through the studs of a partition between rooms; and Fig. 17 is a horizontal sectional view of a mold suitable for molding the vertical stud in the situation illustrated in Fig. 6.

In all of the views, like parts are designated by the same reference characters.

I will describe my invention in connection with a two-story and cellar building having a hipped roof, the latter being covered with shingles or tiles. This description will make clear the principles of the invention which may be applied to the construction of buildings of different shapes and sizes.

Referring particularly to Fig. 2: in the cellar is the footing 1 formed of any suitable material, such as concrete. Upon this footing and resting in notches in its upper face, best shown in Fig. 15, are the outer slab 2, middle slab 3 and inner slab 4. These slabs are best made of reinforced concrete. Above the outer and middle slabs is a spandrel beam 5, preferably formed of reinforced concrete and having a notch in its outer face for engagement with the outer slabs, as best shown in Fig. 13. Above the spandrel beam 5 is an outside slab 6 extending to the top of the first story. Above this slab is a spandrel beam 7, preferably notched as best shown in Fig. 8. Above this spandrel beam 7 is an outside slab 8 engaging in a notch in the spandrel beam 7, as shown in Fig. 8, extending up to the soffit 9. As shown in Fig. 3, the slab 8 is made with an outturned upper edge so as to form a foundation for supporting the soffit slab 9.

Referring particularly to Figs. 2 and 3 it will be seen that the soffit 9 is supported upon a corbel 10. This corbel also supports the roof slabs 11. These slabs carry the tiles, or shingles 12; they also carry the gutter 13, see Fig. 2. The roof is supported upon rafters 14. The slabs 2, 6 and 8, in the embodiment shown, constitute the outer wall of the building. Inside of the wall there is a floor beam 15 for the second floor and a floor beam 16 for the first floor. The inside wall and the ceiling are composed of lath or other reticulated backing 17 and a layer of plaster 18 attached to said backing. All of these parts, with the exception of the tiles, plaster, plaster backing and gutter are formed of reinforced concrete of certain standard sizes and shapes. In this specification I denominate such parts as "factory molded" elements. All of these parts are secured together and locked into position by means of reinforced concrete elements which are molded in place after the factory molded elements have been properly assembled. These latter elements I denominate in the specification as "field molded" elements. In the particular embodiment chosen for illustration, the field molded element is a vertical stud 19. This element engages with the edges of the slabs, the ends of the spandrel beams, the outer ends of the floor beams and rafters and the inner ends of the corbel and locks all of the parts together. The manner in which this is accomplished will be described after the following description of the roof structure and corbel structure.

Referring particularly to Figs. 3 to 7 inclusive, it will be seen that the corbel has a projecting reinforcement 20 on its rear side. It also has a projecting reinforcement 21 on its upper edge, and when the stud is molded in the manner to be described, the projecting reinforcements 20 are embedded in the stud and the corbel is held in position. The roof slabs 11 are introduced into place upon the corbel with a separating space between them into which the projecting reinforcement 21 lies and a mass of grouting 22 is introduced into this space. The roof slabs 11 are provided with dovetailed pockets, shown in Fig. 3, and in these pockets are nailing strips 23, preferably of wood, for the reception of the fastenings for the shingles, or tiles. On the lower member of the corbel 10 are flanges 24. On these flanges rest the soffit slabs 9, best shown in Fig. 4. The floor beams 15 and 16 have projecting reinforcements 25, as shown in Fig. 3, and when the stud is molded in place, it embeds the ends of the beams and unites with the projecting reinforcement, thus locking the two parts together at each floor level. Reinforced floor slabs 26 are secured to the upper faces of the floor beams and in turn support a wooden floor 27. This structure is best shown in Figs. 8 and 13. The usual washboard 28 is provided, together with a nailing strip 29 to which it is secured. The spandrel beam constitutes a band course at each floor line. This spandrel beam extends from one stud to another as shown in Fig. 2. It may, however, be longer, as shown in Fig. 12$^a$. It is provided with notches 30 at suitable intervals, forming recesses for the reception of the fronts of the vertical studs. Where the spandrel beam is in short sections, as shown in Figs. 11 and 12, the notches are in the ends thereof. When the spandrel beam is longer, as illustrated in Fig. 12$^a$, there are intermediate notches in addition to the end notches. These spandrel beams are formed of reinforced concrete and in each notch is a loop 31 of the reinforcing material. Where short beams are used, as shown in Fig. 12, the loops overlap, forming a pocket for the introduction of the reinforcement 25 of the stud. In the embodiment illustrated in Fig. 12$^a$, the reinforcements are made with a loop to form a pocket for the same purpose. As shown, the spandrel beams 5 and 7 is each provided with a shoulder 32 to form a backing for the lower edge of its outside slabs 6 or 8.

Referring particularly to Figs. 13, 14 and 15, it will be seen that the outer slab 2 has a flange 33, while the inner slab 4 has a flange 34. These flanges together with the ends of the slabs 3, where they occur, define the shape of the stud and take the place of the mold about to be described. This mold, best illustrated in Fig. 17, defines the shape of the stud from the first floor upward. The mold may be formed of metal, wood or other suitable material and is made in two parts, the inside part 35 goes inside of the building and the outside 36 goes on the outside.

The parts are assembled in the following manner: After the footing 1 is in position, the foundation slabs 2, 3 and 4 are put in place and a mold similar to the mold 36 is placed over the space between the ends of the slabs 4. The reinforcements 25 for the studs 19 are then introduced, and concrete is poured into the space between the ends of the slabs 2 and the mold and the flanges 33 and 34. When the concrete reaches the proper level, the first floor beams are placed in position upon it. More concrete is added until the tops of the slabs 2 and 3 are reached. The spandrel beam 5 is now placed in position on top of the slabs 2 and 3 and the concrete between them. The reinforcing loops 31 will engage the reinforcements 25 of the stud which will fill the notch 30 in the spandrel beam.

Referring particularly to Fig. 14 it will be seen that the reinforcements of the slabs 2 project inward to a point slightly removed from their outer edges, while the reinforcements of the slabs 3, 4, extend straight out. Where the interior timbered effect is not desired the alined edges of the slabs 4, 4 may abut below the beam 16 and define the inner side of the stud. In this event the ends of the beams will rest within notches in the upper corners of the slabs 4, 4. There will now be produced a structure comprising the slabs 2, 3 and 4, the spandrel beam 5, the floor beams 16 and studs 19 extending up through the spandrel beam 5. The slabs 6 are now placed in position with their lower edges resting against the shoulders 32 of the spandrel beam 5. A mold, similar to that shown at 35 in Fig. 17 is placed in alinement with the stud thus far completed, and rests upon the floor beam 16 and the spandrel beam 5. The reinforcements 25 are extended upward to the level of the second floor. The slabs 6 define the front of the mold. Concrete is now poured into the mold until the level for the second floor beam is reached. The floor beam 15 is placed in position with its end resting on the stud, the spandrel beam 7 is placed in position resting on the top of the slabs 6 with the loops of its reinforcements embracing the reinforcements 25. The slabs 8 are now put in place resting upon the spandrel beam 7. The molds 35 and 36 are placed upon the beams 7 and 15 with the staples 37 in place and concrete is poured in until the roof level is reached when the rafters 14, corbels 10 and soffits 9 are put in place and their projecting reinforcements are embedded in the stud. After the rafters and corbels are in place, the roof slabs are positioned and the grouting 22 introduced in the joints and, uniting with the projecting reinforcements of the rafters and corbels on one hand and the roof slabs on the other, will make a unitary structure. The final covering of the roof, consisting of shingles or tiles, is then secured in place, the fastenings entering the nailing strips 23. The operation so far described will produce a building comprising walls, floor beams and roof. The floors are built up in the usual manner. The inner lining of the building is now applied in place.

One feature of this invention is the production of a building having vertical molded elements or studs and with an inner lining producing an air space all around the building, including the space occupied by the studs. This inner lining comprises the plaster 18 and the filamentous backing, or lathing 17. This backing is held in place by any suitable devices, such for example as those disclosed in my hereinbefore referred to copending application for Patent No. 827,080. The outside of the first story of the building is shown as covered by a coating 40 of stucco, and the outer wall of the cellar is similarly coated with a waterproof material.

Fig. 12$^b$ shows an embodiment of the invention in which both outer and inner walls are formed of lath and plaster, both walls being held in place by the staples previously described.

Fig. 12$^c$ shows a modification similar to that described in the preceding figure, except that the stud projects beyond the face of the outer wall of plaster and in this modification the ends of the lath or backing for the outer wall, is embedded in the stud.

The invention may be modified to suit different kinds of buildings

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. A reinforced concrete structure, which comprises premolded horizontal members with projecting reinforcements and premolded slabs for exterior walls, said slabs engaging the members and having projecting reinforcements, field molded vertical elements embedding the projecting reinforcements of the said slabs and horizontal members, in combination with an interior coating separated from such vertical elements by an air space.

2. A reinforced concrete structure which comprises a premolded spandrel beam, a plurality of vertical spaced slabs engaging the beam, said slabs having reinforcements projecting at their ends, and end flanges extending inwardly, in combination with a field molded vertical element embedding said projecting reinforcements, and having a portion of its sides defined by said flanges.

3. A reinforced concrete structure which comprises a horizontal spandrel beam with an inset shoulder extending the full length thereof, a plurality of alined vertical slabs engaging with said shoulder and each separated from its neighbor by a space, in combination with a molded vertical, load carrying element embedding the spandrel beam and the adjoining ends of such slabs filling the spaces between the slabs and projecting beyond the outside face thereof to impart a paneled effect.

4. A reinforced concrete structure which comprises an alined premolded spandrel beam composed of sections arranged end to end, the end of each section being rabbeted, vertical outside slabs having reinforcements with projecting portions which enter the rabbets, and a field molded vertical load carrying element molded around the ends of the sections and within the rabbet and embedding the projecting reinforcements.

5. A concrete structure which comprises premolded spandrel beams arranged on the same horizontal plane and having rabbeted ends, there being reinforcements within the beams which project beyond the ends thereof into such rabbets, and slabs having reinforcements with projecting portions which enter the rabbets, in combination with a field molded vertical, load carrying element lying within the rabbets embedding the projecting reinforcements and the ends of the beams.

6. A reinforced concrete structure which comprises a plurality of horizontal, premolded spandrel beams having reinforcements with projecting portions, said beams being spaced apart one above the other, a plurality of field molded, vertical, reinforced load carrying elements spaced apart, a vertical slab having projecting reinforcements, said slab engaging the beams and load carrying elements and filling the space formed thereby, the projecting reinforcements of the beams and slab being embedded in the vertical member.

This specification signed and witnessed this 10th day of May, 1915.

JOHN THOMAS SIMPSON.

Witnesses:
HAROLD E. PFEFFER,
ETHEL M. JONES.